Patented Aug. 9, 1927.

1,638,089

UNITED STATES PATENT OFFICE.

RALPH B. DERR, OF FLUSHING, NEW YORK, ASSIGNOR TO GENERAL CHEMICAL COMPANY, OF NEW YORK, N. Y., A CORPORATION OF NEW YORK.

FUNGICIDE.

No Drawing. Application filed March 14, 1925. Serial No. 15,596.

The object of my invention is to provide means for enabling sulfur, a well known fungicide, to be more effectively dusted or sprayed.

Sulfur, when used for dusting or spraying plants, in order to kill fungus growths thereon, ought to be in a very finely divided condition. Dry sulfur, particularly in this condition, tends to cling together in balls and lumps, and when dusted or flowed therefore acts rather as if it were a moist product with particles adhering. When finely divided sulfur is to be sprayed, it has to be mixed with water, but being non-wettable refuses to go into suspension and tends to float at the surface of the water unless first made into a paste by the addition of a small proportion of water. Even after having been made into a paste, sulfur will not go into effective suspension.

I have found that by mixing finely divided sulfur, soap bark and aluminum resinate, I obtain a fungicide which will flow readily when dry and which will mix readily with water to form a sprayable suspension. For dusting I prefer to employ a mixture of 2.8 parts by weight of soap bark, 2.2 parts of aluminum resinate and 95 parts of sulfur; for spraying I prefer to employ a mixture of 5 parts by weight of soap bark, 4 parts of aluminum resinate, 1 part of powdered soap, preferably castile soap, and 90 parts of sulfur.

When soap bark is mixed with sulfur, the latter can readily be wetted, that is to say, will readily mix with water, thus making it possible to suspend the sulfur in water and to have it spread better when sprayed on the foliage.

A mixture of sulfur and soap bark, when dusted on moist leaves, or on leaves which are soon thereafter moistened by dew or light rain, will stick to the leaves, whereas sulfur alone will not stick thereto.

When aluminum resinate is mixed with dry sulfur, there is imparted to the latter the very distinct property of flowing like a very dry sand or a very dry dust, and the tendency of the sulfur, particularly when in very finely divided form, to ball or adhere is eliminated, even though only as little as one part of aluminum resinate be added to 99 parts of sulfur. Aluminum resinate will also create a decided increase in the suspensibility of the sulfur in water if the sulfur has first been mixed with a little water to form a paste. Whether the sulfur-resinate mixture is dusted dry or sprayed wet, the resinate will cause a better sticking of the sulfur to the leaves.

It will be understood that when the qualities of suspension of a fungicide are good the spraying qualities thereof are substantially just as good, at least in the majority of cases, as the extent to which a fungicide can be suspended in water determines, generally speaking, the extent to which it can spread uniformly on the plant. The use of a mixture of soap bark and aluminum resinate, as a spreader with sulfur results in a decided improvement over the use of sulfur with soap bark alone, or with aluminum resinate alone. The advantage of using soap bark and resinate over using the resinate alone is that the necessity of making a preliminary paste of the sulfur is obviated. The labor of preparing the preliminary sulfur paste is thus made unnecessary; in fact, the farmer or orchardist could undoubtedly not be induced to use a fungicide which necessitated such preliminary labor. When a mixture of sulfur and aluminum resinate is dusted onto a wet leaf, the mixture tends to float on top of the moisture film and will therefore not touch the leaf until the moisture has evaporated; with the addition of soap bark, however, the sulfur, having become readily wettable, will penetrate through the film of moisture to the leaf immediately.

The addition of aluminum resinate, on the other hand, to a mixture of soap bark and sulfur, will cause such mixture to flow more freely when dusted and to stick to the leaf more firmly; and will enable the sulfur to go into a much higher degree of suspension when used in a spray and also to stick more readily to the leaf.

In place of aluminum resinate I may use any other suitable resinates, thus, I may use alkali resinates (f. i., sodium or potassium resinate), alkali earth resinates, (f. i., calcium resinate) and metallic resinates (f. i., lead, manganese or zinc resinate).

In place of soap bark I may use various other vegetable barks, or leaves, berries, roots or herbs, probably because their water or alcohol extractable ingredients are substantially the same, or similar to, the water and alcohol extractable ingredients of soap bark. Thus I may use the following barks:

white pine, prickly ash, white oak, red oak, white poplar, cottonwood, dogwood, bayberry, elm, cascara sagrada, black haw, buckthorn, mazerion, condurango, cramp, prince's pine; the following leaves: buck bean, witch hazel, yerba santa, urva ursi, digitalis, senna; also licorice root, laurel berries and prickly ash berries. The proportions would have to be determined by experiment and the results would not, in all cases, be equal to those obtained by the use of soap bark. For instance, berries are excellent wetters but do not give quite as high a degree of suspension even with aluminum resinate.

Aluminum resinate alone will cause sulfur to dust freely; that is, when the mixture is dusted it will float through the air as a cloud and settle very uniformly in its finely divided form instead of falling in heavy blotches as would be the case if sulfur were used alone. I may profitably use from 1-2 parts of the resinate to 99-98 parts of sulfur. As already indicated, however, it is desirable to add a small amount of soap bark or other wetter to the sulfur-resinate mixture in order that, when dusted on damp plants, the fungicide will mix with the moisture on the leaves and thus come into contact with the leaf as soon as possible.

I have already given my preferred formula for the mixture of sulfur, resinate and bark for a dusting mixture. I may, however, vary this formula within wide limits. As other examples, I may give sulfur 97 parts, white pine bark 2 parts, aluminum resinate 1 part.

I have already given my preferred formula for a mixture to be used for spraying and have indicated that I prefer to add a small proportion of powdered soap, preferably castile soap. I have found that the soap aids the soap bark in wetting the sulfur. Again, I may vary the proportions within wide limits but have found that the finer the sulfur the greater should ordinarily be the percentage of wetter, i. e., soap bark, or soap bark and powdered soap. In my preferred formula the sulfur is of a fineness known in the trade as "superfine". It is advantageous to grind the soap bark as fine as reasonably possible. In my preferred formula the fineness is such that over 90% of the bark would pass through a 200 mesh sieve. The resinate should be ground to a degree of fineness approximately equal to that of the soap bark. The finer the various ingredients the better are the results obtained.

The following formulas may be used, the main ingredients being of approximately the degree of fineness already indicated: Sulfur 90 parts, soap bark 7 parts, aluminum resinate 2 parts, powdered soap 1 part.

I may add other ingredients to my mixture. For instance, if a mixture is to be produced which is to act both as a fungicide and as an insecticide, I may add calcium arsenate or lead arsenate thereto; thus I may use 83 parts of sulfur, 12 parts of commercial calcium arsenate and 5% of a mixture which is itself composed of 5 parts of soap bark and 4 parts of aluminum resinate.

When in my claims I refer to a "resinate", I intend to cover all resinates which may be found suitable for use in the combination claimed, but not such resinates as may be found unsuitable. I have, however, not yet found a resinate which is unsuitable for this purpose; on the other hand, aluminum resinate gives the best suspension for sulfur, with manganese resinate a close second.

When in my claims I refer to a "bark" I intend to cover all such barks, leaves, berries, roots or herbs as may be found suitable for use in the combination claimed, but not such as may be found unsuitable.

I claim:

1. As a fungicide, a composition of sulfur, a vegetable bark and a resinate.

2. As a fungicide, a composition of sulfur, a vegetable bark and aluminum resinate.

3. As a fungicide, a dusting compound comprising a major portion of sulfur and a minor portion of a resinate in quantity sufficient to make a freely flowing mixture.

4. As a fungicide, a composition of sulfur, soap bark and aluminum resinate.

5. As a fungicide, a composition of sulfur, soap bark, aluminum resinate and powdered soap.

6. As a fungicide, a dusting compound comprising a major portion of sulfur and a minor portion of aluminum resinate in quantity sufficient to make a freely flowing mixture.

RALPH B. DERR.